United States Patent
Day et al.

(10) Patent No.: US 8,065,401 B2
(45) Date of Patent: Nov. 22, 2011

(54) SYSTEMS AND METHODS FOR FRAME ORDERING IN WIDE PORT SAS CONNECTIONS

(75) Inventors: Brian A. Day, Colorado Springs, CO (US); Srikiran Dravida, Norcross, GA (US)

(73) Assignee: LSI Corporation, Milpitas, CA (US)

( * ) Notice: Subject to any disclaimer, the term of this patent is extended or adjusted under 35 U.S.C. 154(b) by 2221 days.

(21) Appl. No.: 10/920,984

(22) Filed: Aug. 18, 2004

(65) Prior Publication Data

US 2006/0039405 A1 Feb. 23, 2006

(51) Int. Cl.
*G06F 15/173* (2006.01)
(52) U.S. Cl. .......................... 709/223; 709/224; 709/230
(58) Field of Classification Search ................... 709/223, 709/224, 230
See application file for complete search history.

(56) References Cited

U.S. PATENT DOCUMENTS

| | | | |
|---|---|---|---|
| 6,098,109 A | 8/2000 | Kotzur et al. | |
| 6,134,630 A | 10/2000 | McDonald et al. | |
| 6,493,750 B1 | 12/2002 | Mathew et al. | |
| 6,965,956 B1 * | 11/2005 | Herz et al. | 710/74 |
| 7,035,952 B2 * | 4/2006 | Elliott et al. | 710/300 |
| 7,155,546 B2 * | 12/2006 | Seto | 710/100 |
| 7,376,147 B2 * | 5/2008 | Seto et al. | 370/465 |
| 7,415,723 B2 * | 8/2008 | Pandya | 726/13 |
| 2002/0184417 A1 | 12/2002 | Lin et al. | |
| 2003/0172335 A1 * | 9/2003 | Das Sharma | 714/746 |
| 2005/0125574 A1 | 6/2005 | Foster et al. | |
| 2005/0138154 A1 | 6/2005 | Seto | |
| 2005/0235072 A1 * | 10/2005 | Smith et al. | 710/22 |

* cited by examiner

*Primary Examiner* — Tonia L. M. Dollinger
*Assistant Examiner* — Adnan Mirza
(74) *Attorney, Agent, or Firm* — Duft Bornsen & Fishman LLP

(57) ABSTRACT

Methods and structures for assuring proper sequencing of processing of SAS frames received over multiple physical ports of a SAS wide port. A frame scheduler element is communicatively coupled with a SAS transport layer and with a corresponding plurality of link layers operable as a SAS wide port. The frame scheduler receives a request from the transport layer to locate or select a next received frame for further processing. The frame scheduler interacts with the plurality of link layer processing elements having received frames stored within to locate the link layer that has the requested next frame. The frame scheduler then coordinates operation of that link layer and the transport layer to effectuate the transfer of the required next frame.

15 Claims, 3 Drawing Sheets

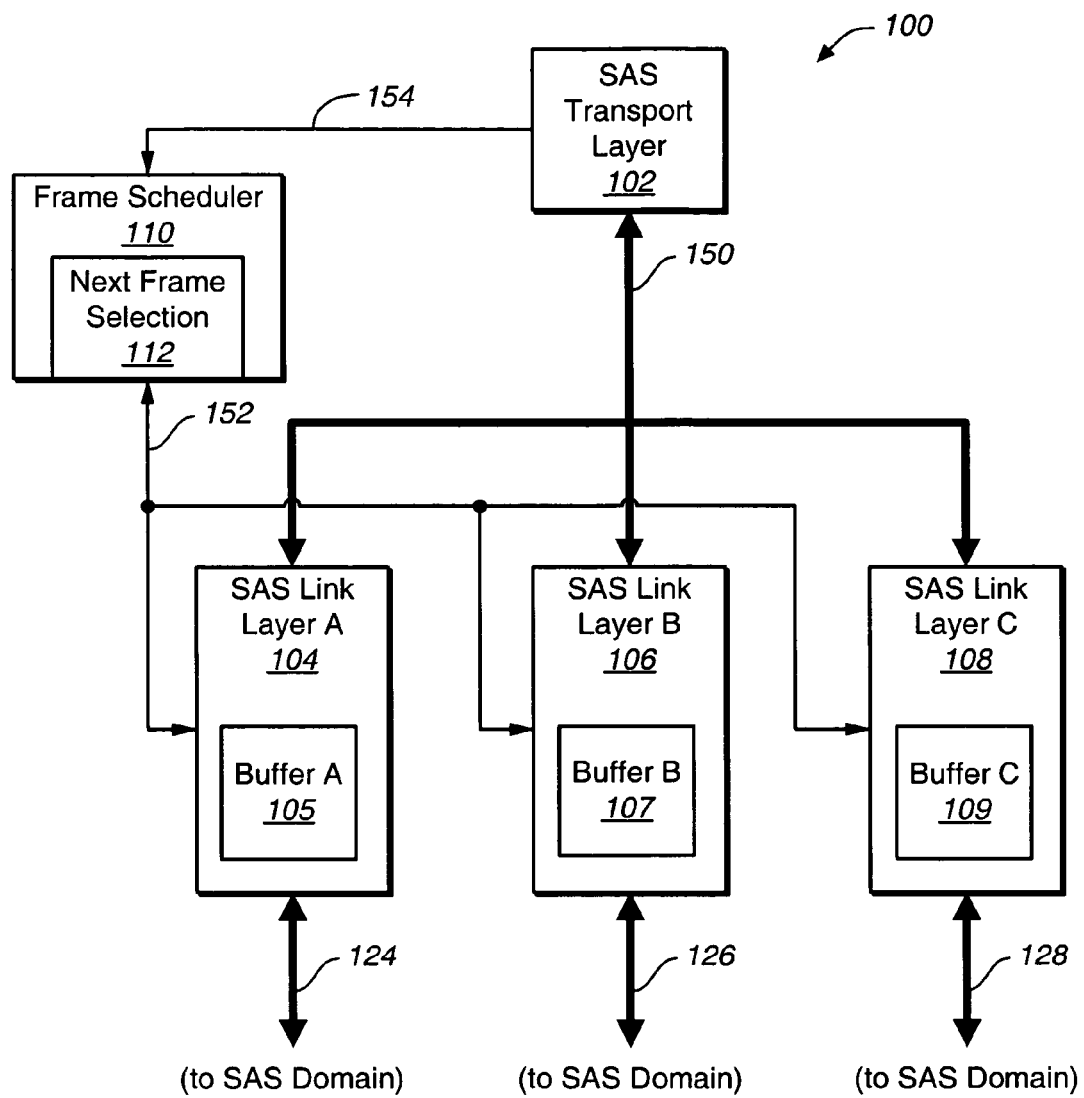
FIG._1

105, 107, 109
| Received Frame Data 200 | Sequence Indicia 202 |
|---|---|
| | |
| | |
| ⋮ | |
| | |
FIG._2
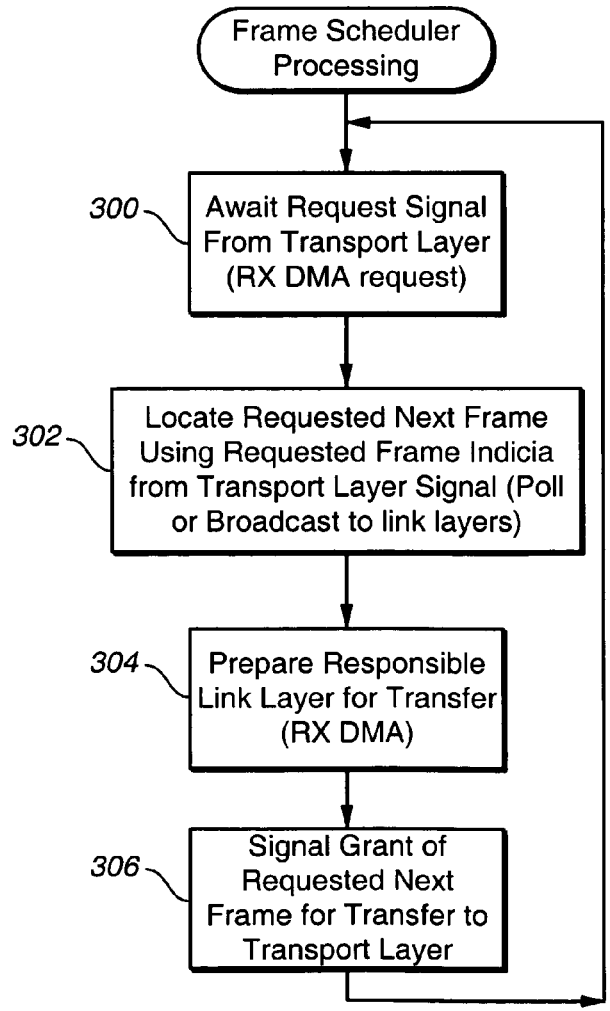
FIG._3

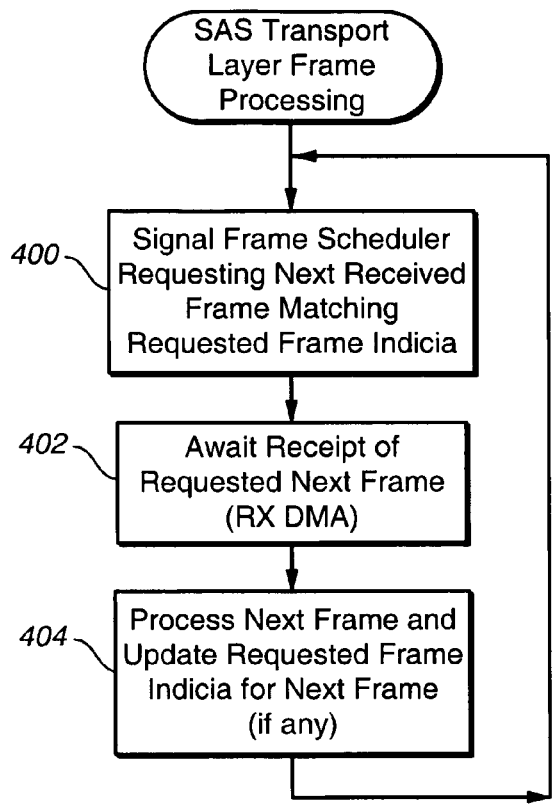
FIG._4
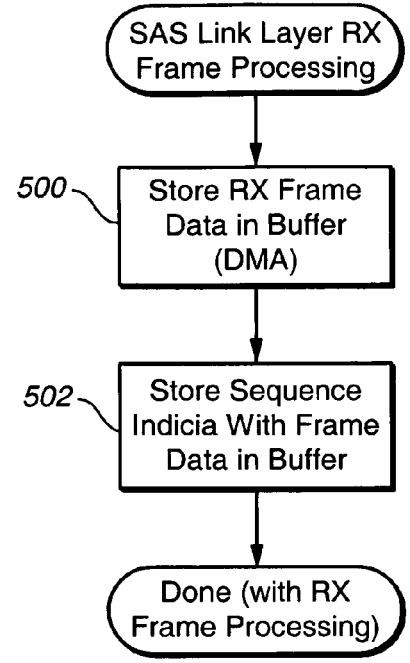
FIG._5
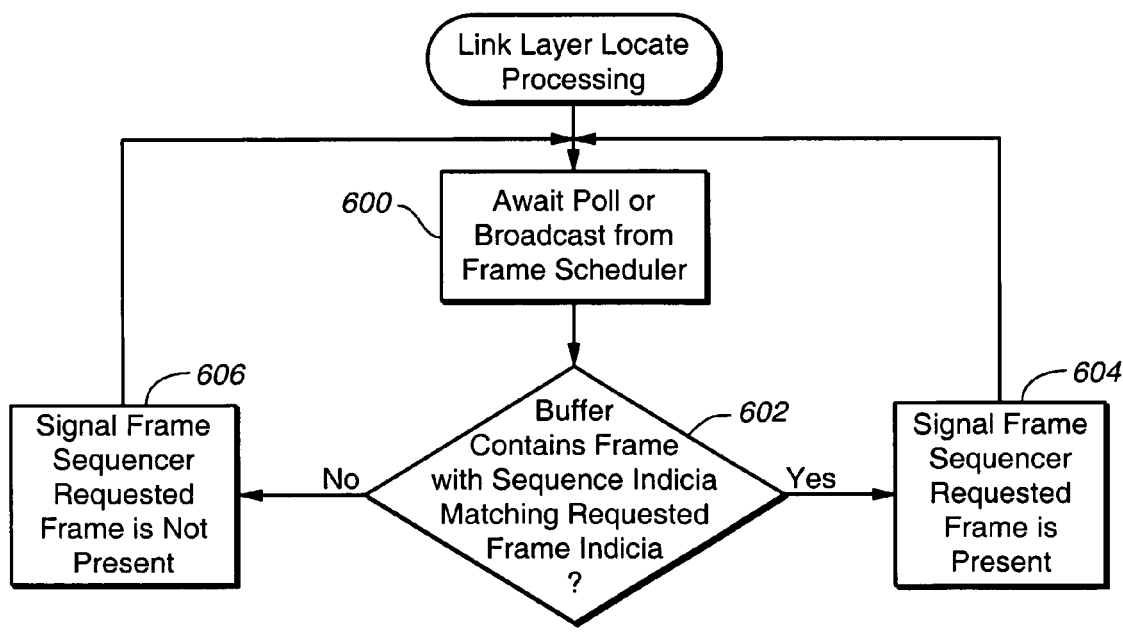
FIG._6

SYSTEMS AND METHODS FOR FRAME ORDERING IN WIDE PORT SAS CONNECTIONS

RELATED PATENTS

This patent is related to co-pending, commonly owned U.S. patent application Ser. No. 10/921,018 filed on Aug. 18, 2004 and entitled SYSTEMS AND METHODS FOR TAG INFORMATION VALIDATION IN WIDE PORT SAS CONNECTIONS which is hereby incorporated by reference.

BACKGROUND OF THE INVENTION

1. Field of the Invention

The invention generally relates to management of SAS wide ports. More specifically, the invention relates to methods and structures for ensuring proper ordering in processing of received frames in a SAS device coupled through a SAS wide port.

2. Discussion of Related Art

Small Computer Systems Interface ("SCSI") is a set of American National Standards Institute ("ANSI") standard electronic interface specifications that allow, for example, computers to communicate with peripheral hardware. Common SCSI compatible peripheral devices may include: disk drives, tape drives, Compact Disc-Read Only Memory ("CD-ROM") drives, CD Read/Write ("CD-RW"), digital versatile disk ("DVD") drives, printers, scanners, etc. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. Examples of serial interface transport media and protocol standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces, media, protocols and commands is generally obtainable at the website www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets via one or more SAS expander devices. In general, as is common in all SCSI communications, SAS initiators initiate communications with SAS targets. In particular, SAS initiators use a process often referred to as "discovery" to determine the topology of devices in the network (i.e., to discover other SAS initiators, SAS expanders and SAS targets). Once such information is known, initiators generally establish the first contacts with a given target device. The initiator issues an "open" request (i.e., a SAS OPEN address frame) to an identified SAS target to establish a first connection with the SAS target device. Once the first connection is so established, either the SAS initiator or the SAS target device may re-establish a connection. For example, a connection may be established initially by the initiator, closed after some transactions are exchanged, and then re-opened by the same initiator for a subsequent sequence of transactions. Or, for example, a SAS target device may have deferred processing of a transaction received from an initiator. At some later time when the SAS target is ready to proceed, the target device may "open" a connection back to the initiator that originally requested the deferred transaction.

In SAS protocol command exchanges, a SAS initiator device sends a command and associated data to a particular identified SAS target device. The command and data exchanged may be voluminous but the SAS specifications limit each frame to approximately 1 kilobyte. Thus a larger exchange must be broken into smaller frames and distributed over a number of frames. Further, since the SAS specifications permit multiple commands/data to be exchanged concurrently. Thus each SAS command is identified with a unique TAG field value. This TAG field value is provided in the headers of each transmitted/received frame so that the receiver may determine which command a received frame is associated with.

SAS specifications also allow for a wide port—a logical port comprising a plurality of physical or link ports (i.e., multiple PHYs) aggregated to operate as one logical port. SAS specifications restrict use of the wide port such that at any given point in time, frames for a particular command may be transferred over only one of the multiple links that make up the wide port at a time. Once one frame is completely transmitted, another frame may be received on the same link or another of the multiple physical links of the wide port. When frames are received, they are typically temporarily stored in buffers associated with the physical link on which the frame was received. Eventually, when the transport layer is ready to process a next received frame, a frame will be transferred from its buffer to the transport layer for further processing. Since the processing of received frames may proceed slower than the speed at which the frames are received, there may be a sequence of received frames scattered in buffers of the various physical links of the SAS wide port.

The received frames in the buffers of the physical links are eventually forwarded up to higher level processing in the SAS controller—i.e., to a transport layer processing element. It is critical that the received frames be forwarded to the transport layer in proper sequential order. In some prior designs, the transport layer and physical or link layer (i.e., the PHY layer) may be tightly coupled in a single processing element. In such a tightly coupled design of the multiple layers of the SAS protocol processing, the sequencing of received frames may be easily maintained between the link layer and the transport layer—i.e., the two layers readily process the same SAS information in received frames. However, in many current designs, more of the processing of the link layer processing element is performed in custom designed circuits to attain higher performance. In such a design, the transport layer may be physically and logically separated from the link layer. The two layers communicate through an interconnecting communication medium and may, for example, be coupled through industry standard interface bus structures such as PCI or AHB/AMBA bus structures. In such designs where the transport and link layers are more separated than integrated, it is more difficult for the transport layer and the link layer to share information. Thus it can be problematic to assure proper sequencing of the processing of received frames as the link layer processing elements are more distinct and separate from the transport layer processing element.

In view of the above discussion, it is evident that there is an ongoing need for improved systems and methods for assuring proper sequencing in the processing of SAS frames received over multiple physical ports of a SAS wide port.

SUMMARY OF THE INVENTION

The present invention solves the above and other problems, thereby advancing the state of useful arts, by providing methods and associated structures for assuring proper sequencing of processing of SAS frames received over multiple physical ports of a SAS wide port. A frame scheduler element is communicatively coupled with a SAS transport layer and with a corresponding plurality of link layers operable as SAS wide port. The frame scheduler receives a request from the transport layer to locate or select a next received frame for further processing. The frame scheduler interacts with the plurality of link layer processing elements having received frames stored within to locate the link layer that has the requested next frame. The frame scheduler then coordinates operation of that link layer and the transport layer to effectuate the transfer of the required next frame.

A first feature hereof provides a SAS controller adapted for performing SAS protocol link layer processing, the controller comprising: a plurality of link layer processing elements for receiving frames from another SAS device over a plurality of SAS communication media wherein each link layer processing element includes a buffer for storing received frames awaiting processing by the controller; a transport layer processing element for processing received frames; a frame scheduler communicatively coupled to the transport layer processing element and communicatively coupled to the plurality of link layer processing elements wherein the frame scheduler is operable in response to receipt of a request from the transport layer processing element to select and retrieve a next received frame to be processed from the buffers associated with the plurality of link layer processing elements.

Another aspect hereof further provides that each received frame stored in the buffer of any one of the plurality of link layer processing elements includes sequence indicia indicating a relationship of the received frame to other frames.

Another aspect hereof further provides that the request from the transport layer processing element includes a requested frame indicia indicating the next frame desired for processing by the transport layer processing element.

Another aspect hereof further provides that the frame scheduler further comprises: a selector to locate the requested frame by comparing the requested frame indicia against each sequence indicia of frames stored in the buffer of any one of the plurality of link layer processing elements.

Another aspect hereof further provides that the frame scheduler further comprises: a broadcaster to broadcast the requested frame indicia to each of the plurality of link layer processing elements and to receive an acknowledgement from one of the plurality of link layer processing elements that has a frame stored in its buffer with a matching sequence indicia.

Another aspect hereof further provides that the frame scheduler further comprises: a poller to poll each of the plurality of link layer processing elements to determine which one of the plurality of link layer processing elements that has a frame stored in its buffer with a matching sequence indicia.

Another aspect hereof further provides that the requested frame indicia and the frame sequence indicia each comprises a unique identifier.

Another aspect hereof further provides that the unique identifier further comprises: a command tag field identifying the TAG of the command to which the frame relates; and a data offset field indicating the sequence of a frame relative to other frames with the same command tag field value.

Another feature hereof provides a method operable in a SAS controller having a transport layer processing element communicatively coupled to a plurality of link layer processing elements and a frame scheduler coupled to the transport layer processing elements and to the plurality of link layer processing elements, the method comprising: storing received frames in a buffer associated with the receiving link layer of the plurality of link layer processing elements wherein the stored received frames are stored with sequence indicia indicating a relationship of the received frame to other frames; receiving in the frame scheduler element a request from the transport layer processing element for a next received frame wherein the request includes a requested frame indicia to identify the desired next frame; determining within the frame scheduler element which one of the plurality of link layer processing elements has the requested next received frame; and returning the requested next frame from said one of the plurality of link layer processing elements to the transport layer processing element.

Another aspect hereof further provides that the step of determining further comprises: comparing the sequence indicia of each received frame stored in the buffers of the plurality of link layer processing elements with the requested frame indicia to identify which buffer stores a received frame having a sequence indicia matching the requested frame indicia.

Another aspect hereof further provides that the step of determining further comprises: broadcasting the requested frame indicia from the frame scheduler to each of the plurality of link layer processing elements; and receiving, in response to the broadcast, an acknowledgement signal from one of the plurality of link layer processing elements indicating that said one of the plurality of link layer processing elements has a frame stored in its buffer with a sequence indicia matching the requested frame indicia.

Another aspect hereof further provides that the step of determining further comprises: polling each of the plurality of link layer processing elements from the frame scheduler to determine the sequence indicia associated with any received frames stored in the buffer associated with said each of the plurality of link layer processing elements and to identify a received buffer stored with sequence indicia matching the requested frame indicia.

Another aspect hereof further provides that the sequence indicia and the requested frame indicia both include a unique identifier.

Another aspect hereof further provides that the unique identifier includes a tag field to identify the command with which the frame is associated and a data offset field to identify the sequence of the frame relative to other frames associated with the same command tag field value.

Another aspect hereof further provides that the step of returning further comprises: applying a grant signal to a requested DMA transfer by the transport layer processing element.

BRIEF DESCRIPTION OF THE DRAWINGS

FIG. 1 is a block diagram of a SAS controller enhanced in accordance with features and aspects hereof to ensure proper sequencing of received frames in a SAS wide port.

FIG. 2 is a block diagram of a typical buffer structure as shown in FIG. 1 in which received frame data and associated sequence indicia may be stored in accordance with features and aspects hereof.

FIG. 3 is a flowchart describing operation of a frame scheduler element as shown in FIG. 1 to coordinate communications between a transport later and multiple link layer processing element in accordance with features and aspects hereof.

FIG. 4 is a flowchart describing operation of a SAS transport layer processing element in cooperation with the scheduler element operation of FIG. 3 and in accordance with features and aspects hereof.

FIG. 5 is a flowchart describing operation of a SAS link layer processing element to receive SAS frames from a communication medium and to store sequence indicia with the received frames in accordance with features and aspects hereof.

FIG. 6 is a flowchart describing operation of a SAS ink layer processing element in cooperation with the scheduler element operation of FIG. 3 and in accordance with features and aspects hereof.

DETAILED DESCRIPTION OF THE DRAWINGS

FIG. 1 is a block diagram of a SAS controller 100 enhanced in accordance with features and aspects hereof. As is common in SAS controllers implementing SAS protocols in accordance with standard specifications, a transport layer processing element 102 provides certain higher level processing features of the SAS protocol while link layer processing elements 104, 106 and 108 provide lower level protocol management features. Each link layer processing element 104, 106 and 108 is coupled to a corresponding SAS communication medium 124, 126 and 128, respectively. The SAS communication media 124, 126 and 128 may be any suitable communication medium supporting the SAS protocols including, for example, conductive wired media, optical media, radio frequency transceiver media, etc.

As used herein, "processing element" refers to an element of SAS controller 100 responsible for processing identified layer of the SAS protocol. In other words, the transport layer processing element 102 is any element providing processing associated with transport layer specifications of the SAS protocol while link layer processing elements 104, 106 and 108 refer to any element within SAS controller 100 responsible for processing lower layer physical and link protocols of the SAS specification. Such processing elements may include discrete processing electronic components as well as programmed instructions operating within appropriate general or special purpose processors. Further, such processing elements may be operable within a single, integrated processing element or may be distributed over plurality of such processing elements.

In general, SAS transport layer processing element 102 exchanges information with link processing elements 104, 106 and 108 via path 150 to effectuate SAS protocol communications with other SAS compliant devices or expanders over SAS communication media 124, 126 and 128, respectively. In general, SAS exchanges may comprise a command generated by an initiator device (such as a host system) and transmitted from the initiator device to a particular target device. When the command is a read request or other request that returns data or status information, the returned information is transmitted from the target device back to the requesting initiator device. Such transmission in the SAS standards are broken into discrete units of information referred to as "frames". One exchange may consist of one or more frames transmitted and received between the SAS initiator and target devices.

Path 150 may be any suitable communication medium. As noted, when the transport layer and link layers are tightly coupled or integrated, they may readily share information. However, where the layers are separated in distinct circuits interconnected by a bus structure (such as PCI or AMBA/AHB), sharing information is problematic in current designs. As shown in FIG. 1, path 150 may be, for example, a PCI bus or an AMBA/AHB bus or other similar, generalized interconnection communication media whereby SAS information is not inherently an aspect of the interconnect media and protocols.

Frames received by a SAS device are received as signals on the SAS communication medium (i.e., 124, 126 or 128) and stored in a buffer (i.e., 105, 107 or 109) by the link layer processing element associated with the communication medium (i.e., 104, 106 or 108, respectively). Each link layer processing element may therefore be associated with a corresponding buffer memory. Buffer memories 105, 107 and 109 may be any suitable memory device for storing such received data including, for example, random access memory devices (RAM) and non-volatile memory devices.

As noted above, in a SAS wide port application, multiple link layers may be logically aggregated to provide a wider (i.e., higher bandwidth) communication link. In such wide port applications, it is important that the transport layer processing element process the received frames in the proper order (i.e., the order in which they are received by the multiple link layer processing elements that comprise the SAS wide port). Where, as in prior designs, the transport layer processing element and the multiple link layer processing elements are tightly integrated, they may readily share SAS protocol information to help assure required sequential processing of the received frames. However, where the transport layer processing elements is separated from the link layer processing elements such that they are coupled via standardized, general purpose bus structures or communication media, such information sharing to assure proper sequential processing of received frames is problematic.

In accordance with features and aspects hereof, SAS controller 100 includes frame scheduler 110. Frame scheduler 110 is communicatively coupled to SAS transport layer processing element 102 via path 154 and is communicatively coupled to each of the plurality of link layer processing elements 104 through 108 via path 152. Frame scheduler 110 receives a signal from transport layer processing element 102 via path 154 indicating readiness of the transport layer to receive a next frame from the link layer processing elements. The signal includes requested frame indicia of the required next frame. Such indicia may include, for example, a command tag value corresponding to the SAS command tag used to identify all frames associated with a particularly command and a data offset value indicating the relative offset of the required next frame relative to all other frames related to the same command tag value. A next frame selection element 112 within frame scheduler 110 interacts with the link layers (104 through 108) via path 152 to locate the required next frame in the buffer (105, 107 or 109) of one of the link layers (104, 106, and 108, respectively). The requested frame indicia may be exchanged between the frame scheduler 110 and the link layers 104 through 108 via path 152 to help identify the required next frame. Further details of methods of operation of the various elements of FIG. 1 to provide desired assurance of proper sequencing are provided herein below.

Those of ordinary skill in the art will readily recognize that other elements may be present or required in a complete SAS controller 100. Only features and aspects related hereto are depicted in FIG. 1. Other desirable or required elements of a SAS controller are generally known to those of ordinary skill in the art. Further, those of ordinary skill in the art will recognize that any number of link layers may be associated with the SAS controller. Further, the particular organization and topology of the elements depicted in FIG. 1 may be modified while still providing features and aspects hereof to assure proper sequencing of processing of received frames in a SAS wide port application.

FIG. 2 shows an exemplary structure for buffers 105, 107 or 109 of FIG. 1 within corresponding link layer processing elements 104, 106 and 108, respectively. In accordance with features and aspects hereof, the buffer may store one or more received SAS frames temporarily until the transport layer retrieves the received, buffered frame for further processing. As shown, such an exemplary buffer may store multiple receive frames. Each stored received frame is saved in a structure including the received frame data portion 200 and a corresponding sequence indicia portion 202. The sequence indicia portion 202 indicates the sequence relationship of the corresponding received frame data portion 200 relative to other received frames (in the same buffer structure or in another buffer corresponding to another link layer processing element.).

The sequence indicia 202 associated with each received frame data portion 200 may be any suitable indicia that associates of the received frame with other related received frames and indicates the relative sequence of the related frames with respect to one another. In one exemplary embodiment, the sequence indicia may comprise the command tag field value from the frame header and a data offset field. The command tag field, as specified in SAS standards, may provide a unique ID associating the frame with a particular command or transaction that elicited the returned data frame. A data offset field value may also be provided to indicate which portion of aggregated total of all returned frames is represented by the corresponding received frame data portion 200. Such an exemplary combination of the command tag and a data offset value associated with each received frame may uniquely identify all frames related to a particular command transaction and further indicate of the relative sequencing of the collection of related frames.

Those of ordinary skill in the art will readily recognize other indicia that may be stored in such a buffer structure and may be useful to determine the sequence of a plurality of received frames in accordance with features and aspects hereof. Further, the structure of a buffer used to temporarily store such received frames may be any suitable structure for storing one or more received frames and an associated sequence indicia for each stored, received frame. For example, in some SCSI storage applications, a command tag may not suffice to uniquely identify a related sequence of frames. The SAS specification assures that a complete set of fields in the frame will suffice to uniquely identify a sequence of related frame exchanges. For example, the combination of an initiator device ID, a target device ID, a logical unit number ("LUN") and a tag value are assured to uniquely identify a sequence of frames related to the same I/O request in a SCSI application. Selection of a sufficient set of frame field values to uniquely identify frames related to a particular I/O operation will be readily apparent as a matter of design choice for those of ordinary skill in the art. As used herein, "unique identifier" may be understood to represent a suitably selected set of field values to uniquely identify a sequence of frames all related to a common I/O request (i.e., sufficient to identify the I/O request.

FIGS. 3 through 6 are flowcharts describing operation of methods within a SAS controller enhanced in accordance with features and aspects hereof (e.g., SAS controller 100 of FIG. 1). In particular, FIG. 3 is a flowchart describing operation of a frame scheduler element within the enhanced SAS controller (e.g., 110 of FIG. 1) to select a next frame for processing in response to a request from the associated transport layer processing element. Element 300 is first operable to await receipt of a request signal from the associated transport layer indicating the transport layer's desire to transfer a next portion of received data (i.e., the data portion of the next received frame). In one exemplary embodiment as noted above where the transport layer and link layer processing elements communicate via an industry standard bus structure (e.g., PCI or AMBA/AHB), the actual transfer of data may be performed using DMA (direct memory access) techniques and structures between the requesting transport layer processing element and the responding link layer processing element. The request signal from the transport layer detected by element 300 may therefore include a DMA request from the DMA features of the transport layer processing element.

Such a request signal from the transport layer processing element also includes requested frame indicia to identify the particular next frame desired for further processing. As noted above, a command tag field value indicating the particular command that initiated the transfer in combination with a data offset field value indicating the order/sequence of the requested frame relative to all other frames associated with the same command tag.

Using the requested frame indicia received from the transport layer signal, element 302 is next operable to select/locate the requested next frame within the buffers associated with the plurality of link layer processing elements. Processing to locate the requested next frame may entail exchanging signals or messages between the frame scheduler element and each of the link layer processing elements. As noted above, such signals may be exchanged via a shared, multi-ported memory structure whereby the frame scheduling element directly addresses and accesses the buffer memory within each of the plurality of link layer processing elements. Also, as noted above, the signals exchanged may be in the form of a broadcast message/signal sent from the frame scheduler to each of the plurality of link layer processing elements requesting a response from the one link layer processing element presently storing in its buffer the identified frame (identified by the supplied requested frame indicia). Still further, as noted above, the signal exchange may entail signals or messages in the form of a polling request directed from the frame scheduler to each of the plurality of link layer processing elements in sequence. Each link layer possessing element will then respond to the poll indicating whether it not it presently stores in its buffer the identified received frame. Whether such a message/signal is broadcast or directed individually to link layer processing elements by polling, the link layer processing element that presently stores the requested frame will respond with a positive acknowledging signal to identify itself to the frame scheduler.

Having so located which of the plurality of link layer processing elements presently stores the requested next frame, element 304 is then operable to prepare the acknowledging link layer processing element for transfer of the identified frame data to the requesting transport layer. As noted above, information exchange between the transport layer and link layer processing elements may utilize well-known bus structures (such as PCI or AMBA/AHB) and associated DMA techniques and structures. Processing of element 304 may entail, for example, preparing the identified link layer processing element for the anticipated DMA transfer initiated by the transport layer processing element. Element 306 then signals a grant signal to commence the transfer of the requested next frame. Again, as above, the grant signal may represent an appropriate signal to allow commencement of the DMA operation by the transport layer processing element. Processing then continues by looping back to element 300 to await receipt of a next request signal from the transport layer.

FIG. 4 is a flowchart describing cooperative processing within the transport layer processing element. As noted above, the transport layer processing element requests a next frame from the frame scheduler upon completion of processing of an earlier received frame. Element 400 then represents processing to signal the frame scheduler requesting a next received frame. Requested frame indicia values are included with the request signal to indicate the particular next frame to be retrieved. As noted above, such indicia may comprise, for example, a command tag field value indicating the particular command for which a next received frame is requested and a data offset value indicating the sequence of the next requested frame relative to other frames associated with the same command tag value.

Element 402 then commences processing to transfer the data portion of the requested frame from an appropriate link layer processing element. The appropriate link layer processing element presently storing the requested frame is identified as discussed above by the frame scheduler element. Further, as noted above, the transport layer may retrieve the returned data using DMA capabilities applied to an interconnecting bus structure between the transport layer processing element and the plurality of link layer processing elements. In such an exemplary embodiment, element 402 represents processing to initialize the DMA structures in preparation for an expected grant signal from the appropriate link layer processing element presently storing the identified requested next frame.

Upon completion of the transfer of the requested next frame from the appropriate link layer processing element to the transport layer processing element, element 404 is then operable to complete processing of the frame just received and to update the requested frame indicia for a next frame, if any, to be retrieved. Processing of the frame by element 404 represents any appropriate processing to forward the data to higher layers of the SAS protocol including, for example, user application or system process that originated the data request. Processing then continues by looping back to element 400 to signal a next requested frame to be retrieved through the frame scheduler element.

Those of ordinary skill in the art will recognize numerous equivalent structures and methods for requesting and exchanging the received frames between the transport layer processing element and an appropriate one of the plurality of link layer processing elements in accordance with features and aspects hereof. In particular, those of ordinary skill and the art will recognize a wide variety of design choices for determining when a next frame must be requested by the transport layer and for implementing the transfer of the data portion of an identified next frame from the link layer processing element to the transport layer processing element. The cooperative exchange utilizing DMA capabilities as described above with respect to FIGS. 3 and 4 is therefore intended merely as representative of one possible embodiment of such features.

As noted above with respect to FIG. 2, the link layer processing elements receive frames from the SAS communication medium coupled thereto and store received frames in a corresponding buffer associated with the link layer processing element. FIG. 5 is a flowchart describing such a process in a link layer processing element to store a received frame in a buffer in conjunction with the associated sequence indicia. The method of FIG. 5 is generally operable in response to a signal or event indicating receipt of a new frame from the SAS communication medium coupled to the link layer processing element.

Element 500 represents processing to store a received frame's data portion in the buffer associated with the particular link layer processing element. Often such link layer processing to receive data from a SAS communication medium involves DMA transfers between a communications controller within the link layer processing element and the buffer memory of the link layer processing element. Element 502 then generates and stores appropriate sequence indicia in the buffer associated with the link layer processing element. The sequence indicia for each receive frame may include, for example, a command tag field value indicating the particular command that initially generated the data request and a data offset value indicating the position of this data portion frame relative to all other frames associated with the same command tag value. Those of ordinary skill in the art will recognize a wide variety of similar techniques for receiving and storing a frame in the buffer memory of the corresponding link layer and for generating appropriate sequence indicia to be associated with each received frame in the buffer.

FIG. 6 is a flowchart describing a method operable within each link layer processing element to respond to the frame scheduler request signals to locate a particular requested next frame in response to such a request from the transport layer. As noted above, when so requested by the transport layer processing element, the frame scheduler element interacts with the plurality of link layer processing elements to locate or select the identified next requested frame. In particular, as discussed above with respect to FIG. 3, the frame scheduler element may signal the link layer processing elements by a broadcast signal applied to all of the plurality of link layer processing elements or may sequentially poll each link layer processing element. Whether polled or broadcast, each link layer processing element receives the message or signal from the frame scheduler element and determines whether it has a frame stored in its buffer with matching indicia.

Element 600 represents processing within the link layer processing element to await receipt of a poll or broadcast signal or message from the frame scheduler. Upon receipt of such a signal, element 602 compares and the requested frame indicia supplied with the received poll or broadcast signal or message against the sequence indicia stored in the link layer processing elements buffer along with each received frame. If element 602 determines that the buffer contains a frame having sequence indicia matching the requested frame indicia, element 604 is then operable to return an appropriate acknowledgement signal to the scheduler element to indicate that the requested frame has been located in this link layer processing element's buffer. Such a positive acknowledgement signal or message may include, for example, pointer or other reference information to allow the frame scheduler element to instruct the transport layer processing element precisely where it may obtain the requested next frame. As noted above, the transfer may be performed by DMA or other similar transfer capabilities and thus the positive acknowledgement signal may include address and length information useful in such a DMA transfer.

If element 602 determines that the buffer of the link layer processing element does not contain a frame having matching indicia, element 606 is operable to return an appropriate negative acknowledgement signal or message indicating that no such next frame was found in this link layer processing element. Those of ordinary skill in the art will readily recognize that if a broadcast signal or message is utilized to contact the link layers, there is no need for a negative acknowledgement to be returned as indicated by element 606. Rather, failure to locate the requested frame may simply result in no return message from that link layer processing element. Only the particular link layer processing element that positively locates the requested frame need acknowledge such a broadcast request message. However, where polling messages or signals are utilized by the frame scheduler, it may be useful for each link layer processing element to acknowledge the received poll request signal either with a positive acknowledgement message or signal or a negative acknowledgement message or signal. Such design choices are well known to those of ordinary skill and the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) controller adapted for performing SAS protocol link layer processing in a SAS wide port, the controller comprising:
   a plurality of link layer processing elements that comprise the SAS wide port for receiving frames from another SAS device over a plurality of SAS communication media wherein each link layer processing element includes a buffer for storing received frames awaiting processing by the controller;
   a transport layer processing element for processing received frames received from said another SAS device over any of the plurality of link layer processing elements comprising the SAS wide port;
   a frame scheduler communicatively coupled to the transport layer processing element and communicatively coupled to the plurality of link layer processing elements wherein the frame scheduler is operable in response to receipt of a request from the transport layer processing element to select and retrieve a next received frame to be processed from the buffers associated with the plurality of link layer processing elements.

2. The controller of claim 1 wherein each received frame stored in the buffer of any one of the plurality of link layer processing elements includes sequence indicia indicating a relationship of the received frame to other frames.

3. The controller of claim 2 wherein the request from the transport layer processing element includes a requested frame indicia indicating the next frame desired for processing by the transport layer processing element.

4. The controller of claim 3 wherein the frame scheduler further comprises:
   a selector to locate the requested frame by comparing the requested frame indicia against each sequence indicia of frames stored in the buffer of any one of the plurality of link layer processing elements.

5. The controller of claim 3 wherein the frame scheduler further comprises:
   a broadcaster to broadcast the requested frame indicia to each of the plurality of link layer processing elements and to receive an acknowledgement from one of the plurality of link layer processing elements that has a frame stored in its buffer with a matching sequence indicia.

6. The controller of claim 3 wherein the frame scheduler further comprises:
   a poller to poll each of the plurality of link layer processing elements to determine which one of the plurality of link layer processing elements that has a frame stored in its buffer with a matching sequence indicia.

7. The controller of claim 3 wherein the requested frame indicia and the frame sequence indicia each comprises a unique identifier.

8. The controller of claim 7 wherein the unique identifier further comprises:
   a command tag field identifying the TAG of the command to which the frame relates; and
   a data offset field indicating the sequence of a frame relative to other frames with the same command tag field value.

9. A method operable in a Serial Attached SCSI (SAS) controller having a transport layer processing element communicatively coupled to a plurality of link layer processing elements that comprises a SAS wide port coupling the controller to another SAS device and having a frame scheduler coupled to the transport layer processing elements and to the plurality of link layer processing elements, the method comprising:
   storing received frames in a buffer associated with the receiving link layer of the plurality of link layer processing elements wherein the stored received frames are stored with sequence indicia indicating a relationship of the received frame to other frames wherein the received frames are received from said another SAS device over any of the plurality of link layer processing elements;
   receiving in the frame scheduler element a request from the transport layer processing element for a next received frame received from said another device over any of the plurality of link layer processing elements wherein the request includes a requested frame indicia to identify the desired next frame;
   determining within the frame scheduler element which one of the plurality of link layer processing elements has the requested next received frame stored in its associated buffer; and
   returning the requested next frame from said one of the plurality of link layer processing elements to the transport layer processing element.

10. The method of claim 9 wherein the step of determining further comprises:

comparing the sequence indicia of each received frame stored in the buffers of the plurality of link layer processing elements with the requested frame indicia to identify which buffer stores a received frame having a sequence indicia matching the requested frame indicia.

11. The method of claim 9 wherein the step of determining further comprises:

broadcasting the requested frame indicia from the frame scheduler to each of the plurality of link layer processing elements; and receiving, in response to the broadcast, an acknowledgement signal from one of the plurality of link layer processing elements indicating that said one of the plurality of link layer processing elements has a frame stored in its buffer with a sequence indicia matching the requested frame indicia.

12. The method of claim 9 wherein the step of determining further comprises:

polling each of the plurality of link layer processing elements from the frame scheduler to determine the sequence indicia associated with any received frames stored in the buffer associated with said each of the plurality of link layer processing elements and to identify a received buffer stored with sequence indicia matching the requested frame indicia.

13. The method of claim 9 wherein the sequence indicia and the requested frame indicia both include a unique identifier.

14. The method of claim 13 wherein the unique identifier includes a tag field to identify the command with which the frame is associated and a data offset field to identify the sequence of the frame relative to other frames associated with the same command tag field value.

15. The method of claim 9 wherein the step of returning further comprises:

applying a grant signal to a requested DMA transfer by the transport layer processing element.

* * * * *